No. 764,222. PATENTED JULY 5, 1904.
C. S. ADAMS & A. J. RICE.
APPARATUS FOR CLEANING AND STERILIZING MILK BOTTLES OR SIMILAR ARTICLES.
APPLICATION FILED JULY 9, 1902. RENEWED APR. 25, 1903.
NO MODEL. 2 SHEETS—SHEET 2.
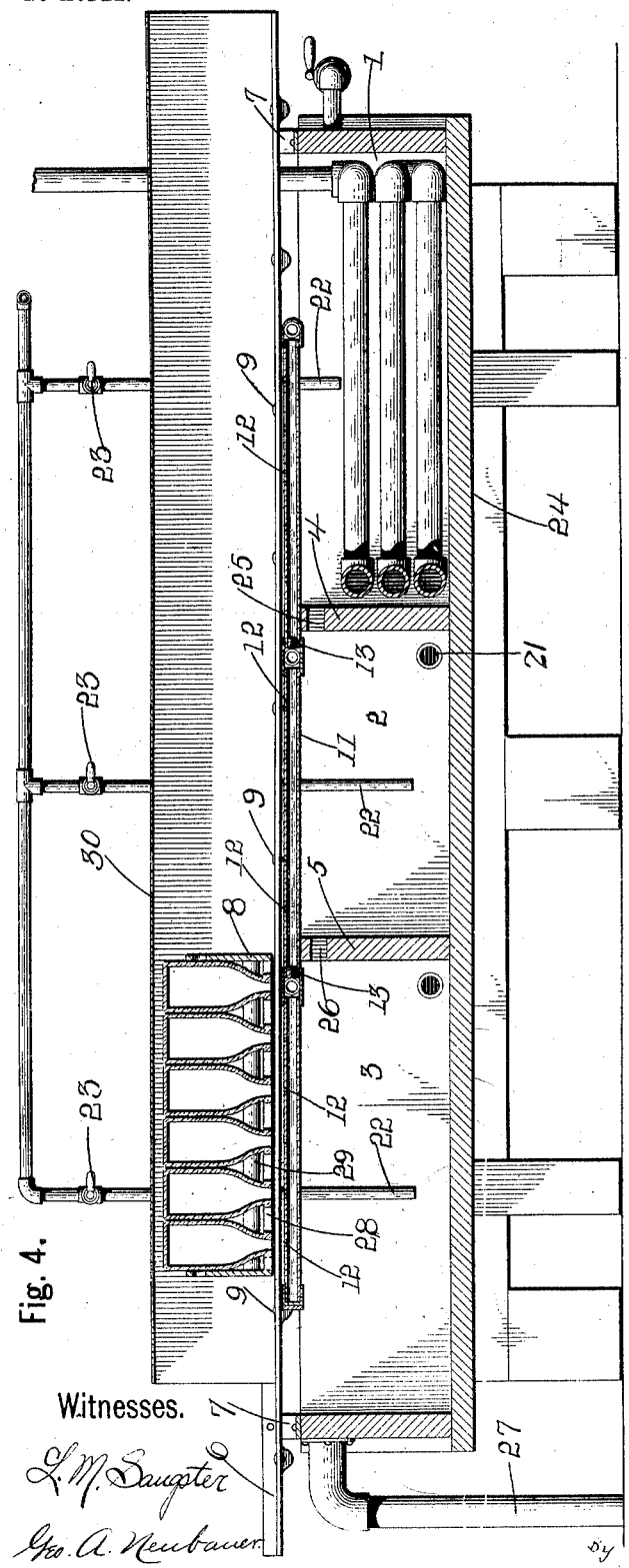
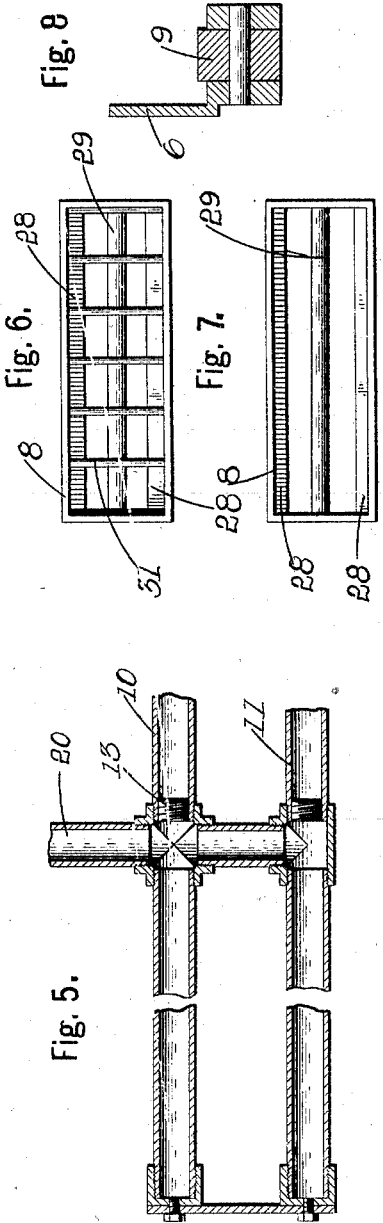
Witnesses.
Inventors.
Charles S Adams.
Albert J Rice.
Attorney.

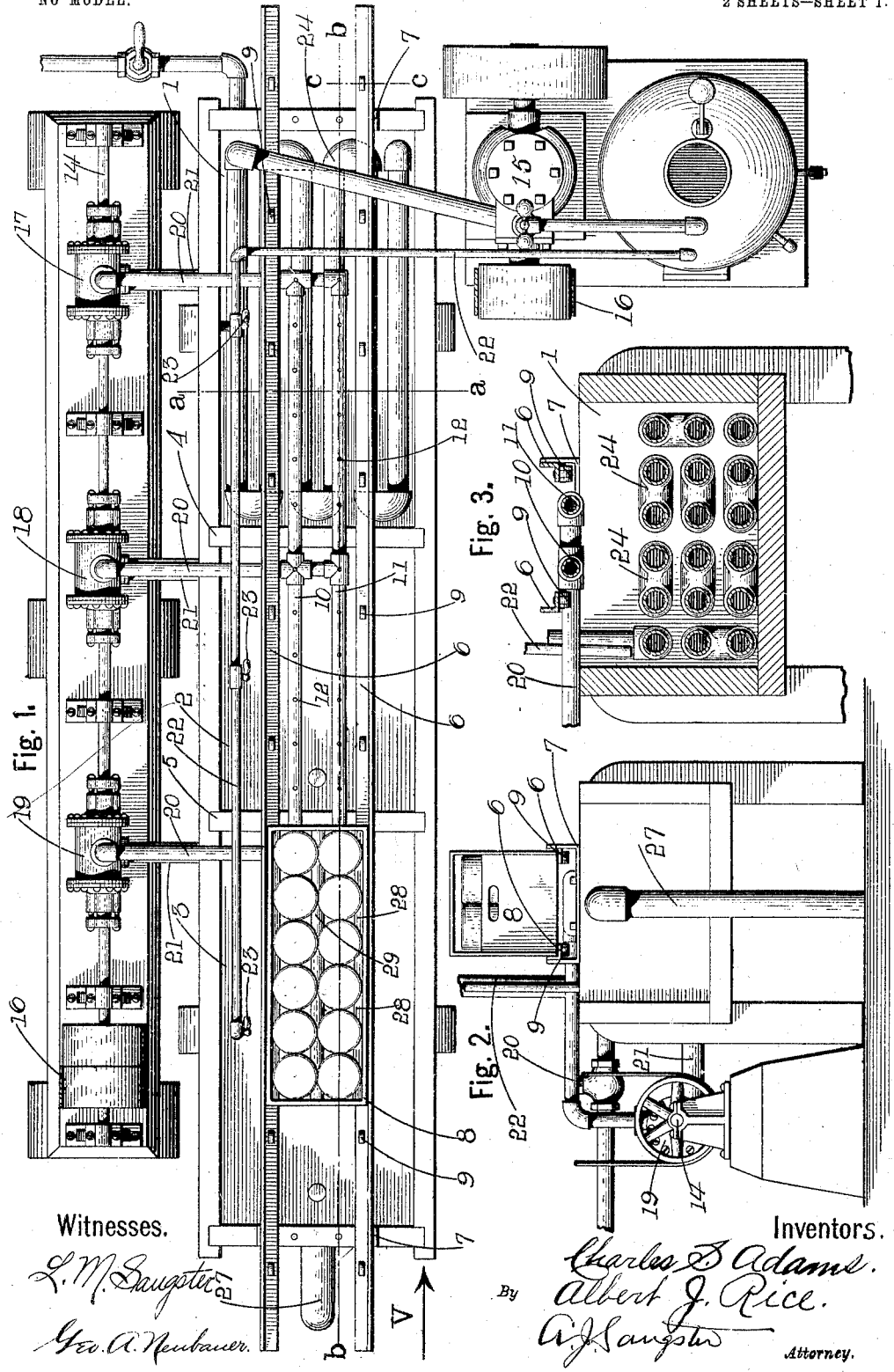

No. 764,222.

Patented July 5, 1904.

UNITED STATES PATENT OFFICE.

CHARLES S. ADAMS AND ALBERT J. RICE, OF BUFFALO, NEW YORK.

APPARATUS FOR CLEANING AND STERILIZING MILK-BOTTLES OR SIMILAR ARTICLES.

SPECIFICATION forming part of Letters Patent No. 764,222, dated July 5, 1904.

Application filed July 9, 1902. Renewed April 25, 1903. Serial No. 154,366. (No model.)

*To all whom it may concern:*

Be it known that we, CHARLES S. ADAMS and ALBERT J. RICE, citizens of the United States, residing at Buffalo, in the county of Erie and State of New York, have invented certain new and useful Improvements in Apparatus for Cleaning and Sterilizing Bottles or Similar Articles, of which the following is a specification.

This invention relates to an improved apparatus for cleaning and sterilizing milk-bottles or the like.

The object of the invention is to thoroughly clean and sterilize bottles or the like in a simple and comparatively rapid manner by passing them in an inverted position above a series of openings from which heated water spurts under a fairly high pressure.

The invention also relates to certain details of construction, all of which will be fully and clearly hereinafter described and claimed, reference being had to the accompanying drawings, in which—

Figure 1 represents a plan view of the apparatus. Fig. 2 is an end elevation of the apparatus looking in the direction of the arrow V, Fig. 1, with the boiler and engine omitted. Fig. 3 is an enlarged cross-section through the tank on line $a\,a$, Fig. 1. Fig. 4 is a vertical longitudinal section on line $b\,b$, Fig. 1. Fig. 5 is a central longitudinal section through a fragment of the cleaning-pipes. Fig. 6 is a detached plan view of the box for holding pint bottles. Fig. 7 is a detached plan view of the box for holding quart bottles. Fig. 8 is a section on line $c\,c$, Fig. 1, through one of the angle-iron tracks.

In the preferred adaptation of the invention shown like numerals designate like parts.

A long rectangular-shaped tank or trough is divided into three compartments 1, 2, and 3 by transverse partitions 4 and 5. Two parallel angle-irons 6 are supported above the top of the trough and extend longitudinally throughout its length, being attached to the cross-irons 7, which extend transversely across the top of the trough. These angle-irons 6 form tracks on which boxes 8, containing bottles in inverted position, are moved and are arranged in opposed position with their horizontal portions extending inwardly toward each other and from the lower extremity of their vertical portions. Rollers 9 may be placed in the horizontal portions of the angle-irons to facilitate the moving of the boxes. Two pipes 10 and 11 are supported on the trough beneath the tracks and extend longitudinally thereof and are each provided with a series of vertical openings 12, which are arranged at regular intervals in the pipes. These pipes 10 and 11 extend throughout the length of the trough and are each divided into three separate and non-communicating parts by plugs 13.

A horizontal shaft 14 is arranged at one side of the trough and is connected to an engine 15 of any well-known form by a belt 16 or other power-transmitting means. Three rotary pumps 17, 18, and 19 are mounted so that the shaft 14 passes through them. An outlet-pipe 20 is connected to the top of each rotary pump and extends into connection with one part of the pipes 10 and 11. An inlet-pipe 21 connects at its respective ends to the lower portion of each compartment and the lower portion of each pump.

The water in the compartments is first heated by means of steam-pipes 22, which extend from the boiler of the engine and have their outer ends projecting into the compartments beneath the surface of the water to discharge the steam therein. These pipes are provided with shut-off valves 23, which are opened when the compartments are first filled with water to heat the same. After the water in the compartments reaches the desired temperature the valves 23 are closed and the succeeding water as it enters is maintained in heated condition by means of a coil of pipe 24 placed in the compartment 1 and connected to the exhaust of the engine. The jets are spaced or separated, according to the articles to be cleaned. For instance, the jets used for washing milk-bottles or the like, which have their mouths separated equally from each other, are arranged at regular intervals, so that all the jets will be vertically below the center of the bottle-mouths when the bottles are moved into a position vertically above said jets. By this means the interior of all of the bottles is thoroughly washed. The exterior surface of the bottle is washed by the jets as the bottles are moving from a position above one compartment to a position above another compartment.

The partition 4 between compartments 1 and 2 is provided with an opening 25 near the top, which permits the water to flow into compartment 2, and the partition 5 between compartments 2 and 3 has a similar opening 26, which permits the water to pass into compartment 3.

The water as it flows from compartment 1 through compartments 2 and 3 is gradually cooled by atmospheric temperature, and substantially the same water is used in each compartment, thereby economizing in the volume of water used.

The arrangement of the compartments is such that the water is in its cleanest and hottest condition when used in compartment 1, into which it first passes, as before described, and over which the bottles receive their last washing.

The water is in its coolest condition in compartment 3, where the bottles receive their first cleaning. The advantage of this is that as the bottles advance over the jets they become gradually cleaner and are exposed successively to water which becomes gradually cleaner and hotter, and thus are thoroughly cleaned and sterilized.

A washing compound of any well-known composition may be used, if desired, in compartment 3 and perhaps compartment 2 to assist in cleaning unusually-dirty bottles.

The object in using pumps is to secure strong pressure of water in the cleaning-pipe 10 and 11, and thus secure sufficient hydraulic force to thoroughly clean off the surface of the bottles.

The waste water is conducted from compartment 3 by a pipe 27.

The boxes for containing the large bottles, such as quart bottles, are each provided with two cleats 28, secured to the interior thereof, and a central brace 29, so that two rows of bottles can be supported in inverted position in each box. A long rectangular cover 30 is placed over the trough to prevent the water spurting out over the top.

The boxes for containing small bottles, such as pint bottles, are provided with a series of additional transversely-extending cleats or braces 31, substantially as shown in Fig. 6, to separate the bottles of each row from each other and thus arrange their mouths at substantially the same distance from each other that the large bottles occupy in the boxes for containing said large bottles.

The operation of the preferred type of this apparatus is as follows: The dirty bottles are arranged in the boxes in inverted position, and the boxes are placed on the tracks and pushed through between the trough and cover 30, passing successively above the various jets of water. The boxes are placed one by one and stand for a short interval above each compartment, the movement of a new box on the tracks moving the preceding boxes one step forward. By this means the boxes successively stop over each series of jets, which enables the water to thoroughly clean both the inside and outside of the bottles. The bottles are first washed by the jets over compartment 3, then advanced over compartment 2, when they are subjected to jets of still hotter water and finally moved above compartment 1, where the washing is finished and the bottles sterilized by jets of water of a temperature at or near boiling-point. From this arrangement of the compartments of the trough the bottles are exposed to water of increasing temperature as they pass through, as before described. The bottles are thus gradually heated and expanded, which prevents breakage. The water is spurted through the openings 13 with sufficient force by the pumps 17, 18, and 19 to completely clean both the inside and outside of the bottles, and the boiling condition of the water in compartment 1 thoroughly sterilizes the same.

It is obvious that the trough or tank may be divided into more or less compartments, as desired, that other forms of pumps instead of rotary pumps may be used, that the water may be heated to boiling-point by means other than a pipe-coil, and that other elements or parts may be varied or changed within the scope of this invention.

We claim as our invention—

1. An improved apparatus for cleaning milk-bottles or the like, comprising a trough, a box adapted to hold the bottles in inverted position and to pass over the trough, a pipe in said trough having openings adapted to spurt water into said bottles as they pass, a pump connected to said pipe, and means for heating the water, substantially as set forth.

2. An improved apparatus for cleaning milk-bottles or the like, comprising a trough divided into a plurality of compartments, a box adapted to pass over the trough in which the bottles are supported in inverted position, pipes supported on said trough and having openings, a pump connected to said pipe, and a steam-pipe for heating the water.

3. An improved apparatus for cleaning milk-bottles or the like, comprising a trough divided into a plurality of compartments by transverse partitions which are provided with openings for the passage of water from compartment to compartment, a box holding bottles in inverted position adapted to pass over the trough, a pipe for introducing water into one of the end compartments, a pipe for removing the waste water from the other end compartment, pipes extending longitudinally of the trough and having openings and pumps for forcing water through said pipes under pressure.

4. An improved apparatus for cleaning milk-bottles or the like comprising a trough over which bottles are adapted to be passed in inverted position, a track on the trough on which boxes containing bottles are moved, pipes on the trough having openings and means for forcing water under pressure through said pipes, substantially as set forth.

5. An improved apparatus for cleaning milk-bottles or the like having a trough divided into communicating compartments, a cleaning-pipe divided into non-communicating sections and having a series of openings, a plurality of pumps, pipes connecting the pumps to the compartments and pipes connecting the pumps to the sections of the cleaning-pipe, substantially as set forth.

6. An improved apparatus for cleaning milk-bottles or the like having a trough divided into communicating compartments, a cleaning-pipe divided into non-communicating sections and having a series of openings, a plurality of pumps having connection by piping to the compartments and the sections of the cleaning-pipe, substantially as set forth.

7. An improved apparatus for cleaning and sterilizing milk-bottles, having an engine, a pump operated from the engine, a trough, a pipe connecting the trough to the pump, a cleaning-pipe connecting to the pump, and a pipe for supplying water to the trough and means for heating the water, substantially as set forth.

8. An improved apparatus for cleaning and sterilizing milk-bottles, having an engine, a trough divided into compartments, a plurality of pumps operated from the engine, a pipe connecting each compartment to one of the pumps, two cleaning-pipes provided with a series of openings and divided into non-communicating sections, each section being over one compartment of the trough, a pipe connecting each pump to one of the sections of the cleaning-pipes, a pipe conducting water to one compartment of the trough and means for heating the water, substantially as set forth.

9. An improved apparatus for cleaning and sterilizing milk-bottles, having an engine, a trough divided into compartments, a plurality of pumps operated from the engine, a pipe connecting each compartment to one of the pumps, two cleaning-pipes provided with a series of openings and divided into non-communicating sections, each section being over one compartment of the trough, a pipe connecting each pump to one of the sections of the cleaning-pipes, a pipe conducting water to one compartment of the trough, means for heating the water, and a coil of pipe in said compartment for additionally heating the water, substantially as set forth.

10. An improved apparatus for cleaning milk-bottles or the like, comprising a trough over which bottles are adapted to be passed in inverted position and divided into a plurality of compartments by transverse partitions which are provided with openings for the passage of water from compartment to compartment, a water-supply pipe connecting to one of the compartments, a water-pipe connecting to another compartment, a steam-pipe connecting to each compartment for heating the water, a steam-coil in one of the compartments, cleaning-pipes extending longitudinally of the trough and having jet-openings adapted to spurt water against the bottles, and pumps connected by piping to the compartments and the cleaning-pipes, substantially as set forth.

11. An improved apparatus for cleaning milk-bottles or the like, comprising a trough over which the bottles are adapted to be passed in inverted positions, a pipe in said trough having openings adapted to spurt water into said bottles as they pass, a pump connected to said pipe, and trough by piping, a water-supply pipe leading to the trough, a steam-coil in the trough for heating the water, and a steam-pipe connecting to the trough for preliminarily heating the water.

CHARLES S. ADAMS.
ALBERT J. RICE.

Witnesses:
CHARLES PANKOW,
A. J. SANGSTER.